United States Patent
Belleschi et al.

(10) Patent No.: US 10,609,521 B2
(45) Date of Patent: Mar. 31, 2020

(54) DECODING MESSAGES BASED ON GROUP IDS

(71) Applicant: TELEFONAKTIEBOLAGET LM ERICSSON (PUBL), Stockholm (SE)

(72) Inventors: Marco Belleschi, Solna (SE); Stefan Wänstedt, Luleå (SE); Mats Folke, Välingby (SE); Johnny Karout, Göteborg (SE); Yunxi Li, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/752,094

(22) PCT Filed: Aug. 12, 2016

(86) PCT No.: PCT/IB2016/054866
§ 371 (c)(1),
(2) Date: Feb. 12, 2018

(87) PCT Pub. No.: WO2017/025934
PCT Pub. Date: Feb. 16, 2017

(65) Prior Publication Data
US 2018/0242118 A1    Aug. 23, 2018

Related U.S. Application Data

(60) Provisional application No. 62/204,808, filed on Aug. 13, 2015.

(51) Int. Cl.
*H04W 4/08* (2009.01)
*H04W 76/50* (2018.01)
(Continued)

(52) U.S. Cl.
CPC .............. *H04W 4/08* (2013.01); *H04W 4/90* (2018.02); *H04W 76/11* (2018.02); *H04W 76/14* (2018.02);
(Continued)

(58) Field of Classification Search
CPC ....... H04W 4/08; H04W 76/45; H04W 76/11; H04W 76/14; H04W 76/40; H04W 4/90; H04W 76/50; H04W 76/34
See application file for complete search history.

(56) References Cited

U.S. PATENT DOCUMENTS

| 5,634,197 A | 5/1997 | Paavonen |
| 2009/0170488 A1 | 7/2009 | Becker et al. |

(Continued)

FOREIGN PATENT DOCUMENTS

| EP | 2001251 A1 | 12/2008 |
| EP | 2571298 A1 | 3/2013 |

(Continued)

*Primary Examiner* — Dady Chery

(57) ABSTRACT

In accordance with certain embodiments, there is disclosed herein a method for decoding a received message. The method comprises determining one or more non-reserved group IDs associated with a first wireless device. The method additionally includes participating in a communication session based on a first group ID of the one or more non-reserved group IDs associated with the first wireless device. The method further includes receiving a first message from a second wireless device. The first message comprises a second group ID. The second group ID is not among the one or more non-reserved group IDs associated to with the first wireless device. The method also comprises determining the second group ID is a reserved group ID. The method additional comprises decoding the first message based on the second group ID.

27 Claims, 5 Drawing Sheets

(51) Int. Cl.
*H04W 4/90* (2018.01)
*H04W 76/34* (2018.01)
*H04W 76/14* (2018.01)
*H04W 76/40* (2018.01)
*H04W 76/11* (2018.01)
*H04W 76/45* (2018.01)

(52) U.S. Cl.
CPC ........... *H04W 76/34* (2018.02); *H04W 76/40* (2018.02); *H04W 76/45* (2018.02); *H04W 76/50* (2018.02)

(56) References Cited

U.S. PATENT DOCUMENTS

| 2011/0161399 A1* | 6/2011 | Agulnik | H04M 3/4935 |
| | | | 709/203 |
| 2013/0102351 A1* | 4/2013 | Mo | H04W 4/10 |
| | | | 455/518 |

FOREIGN PATENT DOCUMENTS

| GB | 2368493 A | 5/2002 |
| WO | 2015020375 A1 | 2/2015 |
| WO | 2015021185 A1 | 2/2015 |

* cited by examiner

DECODING MESSAGES BASED ON GROUP IDS

This application is a 371 of International Application No. PCT/IB2016/054866/053062, filed Aug. 12, 2016, which claims the benefit of U.S. Provisional Application No. 62/204,808, filed Aug. 13, 2015, the disclosures of which are fully incorporated herein by reference.

TECHNICAL FIELD

Embodiments presented herein relate to mobile communication, and in particular to methods, network nodes, wireless devices, computer programs, or computer program products for decoding messages based on group IDs.

BACKGROUND

Device-to-device communication is a well-known and widely used component of many existing wireless technologies, including ad hoc and cellular networks. Examples include Bluetooth and several variants of the IEEE 802.11 standards suite, such as Wi-Fi Direct. These systems operate in unlicensed spectrum.

Device-to-device (D2D) communications as an underlay to cellular networks has been proposed as a means to take advantage of the proximity of communicating devices and to allow devices to operate in a controlled to interference environment. Typically, it is suggested that such D2D communication shares the same spectrum as the cellular system, for example, by reserving some of the cellular uplink resources for D2D communication. Allocating dedicated spectrum for D2D purposes is a less likely alternative as spectrum is a scarce resource and (dynamic) sharing between the D2D services and cellular services is more flexible and provides higher spectrum efficiency.

The transmission mode when sending data during D2D communication may be (1) unicast—a specific wireless device (WD) is the receiver; (2) multicast (may also be denoted group cast)—a specific group of WDs are the receivers; or (3) broadcast—any WD may be a receiver.

Where there is no cellular network support for D2D communication, data can be sent from one device to another device without prior arrangement. This may reduce the overhead and increase the communication capacity, which is crucial in emergency situations. In such a scenario, the source device transmits data to one (unicast) or more (multicast/group cast/broadcast) other devices, without first ensuring that the recipients are available and ready to receive the data. While such communication may be used for one-to-one or one-to-many communication, it is particularly effective for multicast and broadcast transmissions. The communication may be realized, for example, via physical layer (PHY) unicast/multicast/group cast/broadcast transmissions. With PHY broadcast transmissions, the transmissions may still be turned into unicast/group cast/multicast at higher layers. For example, in the MAC layer, multicast or even unicast addresses may be used. Alternatively, if using broadcast on both PHY and MAC, multicast or unicast IP addresses may be used at the IP layer.

One of the ways to efficiently support D2D communication is to use a scheduling assignment (SA) followed by the data transmission. SAs are control messages used for the direct scheduling of D2D communication. SAs are transmitted by the WD that intends to transmit D2D data and they are received by the WDs that are potentially interested in such data. The SAs are transmitted on dedicated resources characterized by time and frequency, and are typically a sparse resource. For example, a dedicated radio physical channel called PSCCH (Physical Sidelink Control Channel) may be allocated to convey SA information. SAs provide useful information that can be used by the receiver. For example, the informant in the SA may be used to correctly decode the D2D data transmission associated with the SA (e.g., the resources for data transmission, the modulation/coding parameters, timing information, identities for the transmitter and/or receiver, etc.). In particular, in 3GPP parlance standardized SA information is conveyed in the so-called SCI (Sidelink Control Information) format 0, in the PSCCH channel. Typically, but not always, SAs are transmitted prior to the actual data transmission. This may allow a receiver to selectively receive data based on the content of the SAs. The data transmission scheduled by an SA is sometimes called a "transmission pattern".

As an example, consider the situation in which WD-A is to transmit data to WD-B, where both WDs are outside network coverage at the time of data transmission. In such a scenario, WD-A and WD-B both need to be preconfigured with certain information to be able to send and receive data (e.g., resource pool information, such as time and frequency configuration). When WD-A needs to transmit data to WD-B it typically first sends a sync signal. The sync signal is later used as a time reference by WD-B. The next step is for WD-A to transmit an SA, followed by the actual data.

As long as a group of WDs operate within coverage of a communications network, such as a cellular network, signalling can use the existing paths controlled by the base station. However, if the same group of WDs is out of coverage or the WDs are RRC_IDLE (no network control possible), all communication, including signalling, needs to use a direct interface (referred to as PC5 in the specifications).

According to certain 3GPP groups (e.g., 3GPP TSG SA WG1) requirements for Proximity Service (ProSe) communication should provide the means to give some users and/or groups higher priority when transmitting data. Such priority to may be static or dynamic. Priority defines who gets to transmit first when there is a shortage of resources (e.g. when only one transmission at a time is allowed). Further, priority is used to decide if pre-emption is required in order to ensure that the correct transmitter is allowed to transmit.

ProSe functions provision the WD with ProSe Layer-2 Group ID(s) and associated subscribed Group Priorit(ies). The actual provisioning can be done in a number of different ways. For example, while in coverage, the WD is provisioned over the PC3 interface. However, since there may be a case where a WD is first powered on at a location where there is no network coverage, the WD may be pre-provisioned as well.

The provisioning described so far refers to static priorities, which requires no new functionality. User Static Attributes include information categorizing the user (e.g., first responder, second responder, supervisor, dispatcher, and administrator) as well as jurisdictional boundaries and possibly, a preconfigured system-wide individual priority level (e.g., the fire chief of a particular town or district).

Group Static Attributes include information about the nature/type of the group and the owning agency(ies), the jurisdictional boundaries for transmitters and receivers within the group, the normal hours of operation for the group, pre-emption dispositions relative to other groups, and the default minimum priority of the group (the minimum priority characteristics that are guaranteed to all the participants in a group call associated with this group, regardless of their individual priority characteristics).

Dynamic priorities cannot be provisioned in advance since they are a result of a specific situation. User Dynamic Attributes include the user/participant's operational status (e.g. on/off duty), the user's location, the type of incident in which the user is involved (e.g. mission critical push to talk (MCPTT) Emergency or Imminent Peril), whether or not the user initiated the incident, whether it is a formally managed incident and if it is, the boundaries of the incident area, the incident severity and the user's assigned role in the resolution of the incident. Group Dynamic Attributes, similar to user dynamic attributes, include the type of incident (e.g. MCPTT Emergency or Imminent Peril), if any, the group is currently handling and, in case of involvement in a formally managed incident, the boundaries of the incident area and the incident severity. Given the nature of such dynamic priorities it is important that such priorities are distributed to all WDs in a group and also enforced quickly. However, no such mechanism currently exists for wireless communication.

SUMMARY

An object of embodiments herein is to provide reserved group ID(s) that can be used for certain situations, such as emergency situations. The reserved group IDs may be a static set of IDs that are reserved across a system (e.g., a wireless network provider's wireless network, wireless networks within a state or within a country, wireless networks using a particular set(s) of protocol(s), etc.) The reserved group IDs allow WDs to transmit messages to other WDs that are not part of the same group as the transmitting WD and yet still have those WDs decode the transmitted message. This may be particularly useful, for example, when a police officer needs to send a message to a group of firefighters, where the police office is not a part of the firefighter's group session.

According to certain embodiments, a method for decoding a received message comprises determining one or more non-reserved group IDs associated with a first wireless device. The method additionally includes participating in a communication session based on a first group ID of the one or more non-reserved group IDs associated with the first wireless device. The method further includes receiving a first message from a second wireless device. The first message comprises a second group ID. The second group ID is not among the one or more non-reserved group IDs associated with the first wireless device. The method also comprises determining the second group ID is a reserved group ID. The method additionally comprises decoding the first message based on the second group ID.

In some embodiments, the first wireless device is a vehicle and the first message comprises information about a traffic incident.

In particular embodiments, the communication session is a push to talk communication session.

In certain embodiments, the reserved group ID is part of one or more reserved group IDs that are pre-provisioned with the first wireless device.

In some embodiments, the reserved group ID is part of one or more reserved group IDs that are provisioned with the first wireless device after the first wireless device is initialized on a communication network.

In particular embodiments, where the method includes determining the second group ID is a reserved group ID, the method may also include examining a scheduling assignment associated with the first message.

In certain embodiments, the method may also include, upon determining the second group ID is a reserved group ID, stopping further transmission by the first wireless device.

In some embodiments, the first wireless device is configured for cellular communication but is out of range of a carrier's wireless network.

According to particular embodiments, a wireless device for decoding a received message comprises processing circuitry configured to determine one or more non-reserved group IDs associated with the wireless device. The wireless device also includes transceiver circuitry configured to participate in a communication session based on a first group ID of the one or more non-reserved group IDs associated with the wireless device. The transceiver circuitry is also configured to receive a first message from a second wireless device. The first message comprises a second group ID, where the second group ID is not among the one or more non-reserved group IDs associated with the wireless device. The processing circuitry is further configured to determine the second group ID is a reserved group ID and to decode the first message based on the second group ID.

According to certain embodiments, a wireless device for decoding a received message comprises processing circuitry and non-transitory computer readable storage media. The storage media contains instructions that are executable by the processing circuitry, whereby the wireless device is configured to determine one or more non-reserved group IDs associated with a wireless device. The wireless device is further configured to participate in a communication session based on a first group ID of the one or more non-reserved group IDs associated with the wireless device. The wireless device is also configured to receive a first message from a second wireless device. The first message comprises a second group ID. The second group ID is not among the one or more non-reserved group IDs associated with the wireless device. The wireless device is also configured to determine the second group ID is a reserved group ID, and decode the first message based on the second group ID.

According to particular embodiments, a wireless device for decoding a received message comprises a determine module configured to determine one or more non-reserved group IDs associated with a wireless device. The wireless device also comprises a communication module configured to participate in a communication session based on a first group ID of the one or more non-reserved group IDs associated with the wireless device. The wireless device additionally includes a receive module configured to receive a first message from a second wireless device. The first message comprises a second group ID that is not among the one or more non-reserved group IDs associated with the wireless device. The wireless device further includes a second determine module configured to determine the second group ID is a reserved group ID. The wireless device also includes a decode module configured to decode the first message based on the second group ID.

According to certain embodiments, a user equipment, UE, for decoding a received message comprises an antenna configured to send and receive wireless signals. The UE also includes radio front-end circuitry connected to the antenna and to processing circuitry. The radio front-end circuitry is configured to condition signals communicated between the antenna and the processing circuitry. The processing circuitry is configured to determine one or more non-reserved group IDs associated with the UE. The processing circuitry is further configured to participate in a communication session based on a first group ID of the one or more non-reserved group IDs associated with the UE. The processing circuitry is also configured to receive a first message from a wireless device. The first message comprises a second group ID, the second group ID is not among the one or more non-reserved group IDs associated with the UE. The processing circuitry is also configured to determine that the second group ID is a reserved group ID. The processing circuitry is further configured to decode the first message based on the second group. The UE also includes an input interface connected to the processing circuitry and configured to allow input of information into the UE to be processed by the processing circuitry. The UE additionally includes an output interface connected to the processing circuitry and configured to output information from the UE that has been processed by the processing circuitry. The UE further comprises a battery connected to the processing circuitry and configured to supply power to the UE.

Advantageously one or more embodiments disclosed herein allow a WD to receive and decode messages that are sent by other WDs that are not part of the same group as the WD that has received the message. One or more embodiments may further allow a WD to be alerted by other WDs of an emergency situation, even if the receiving WD would not normally decode messages sent by the particular sending WD.

It is to be noted that any feature of any of the above embodiments may be applied to any other embodiment, wherever appropriate. Likewise, any advantage of any of the embodiments may apply to any of the other embodiments, and vice versa, where appropriate. Other objectives, features, and advantages of the enclosed embodiments will be apparent from the following detailed disclosure, attached claims, and drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Particular embodiments are now described, by way of example, with reference to the accompanying drawings, in which.

DETAILED DESCRIPTION

Some of the embodiments contemplated by the claims will now be described more fully hereinafter with reference to the accompanying drawings. Other embodiments, however, are contained within the scope of the claims and the claims should not be construed as limited to only the embodiments set forth herein; rather, these embodiments are provided by way of example to help convey the scope of the inventive concept to those skilled in the art. Like numbers refer to like elements throughout the description.

Figure 1:
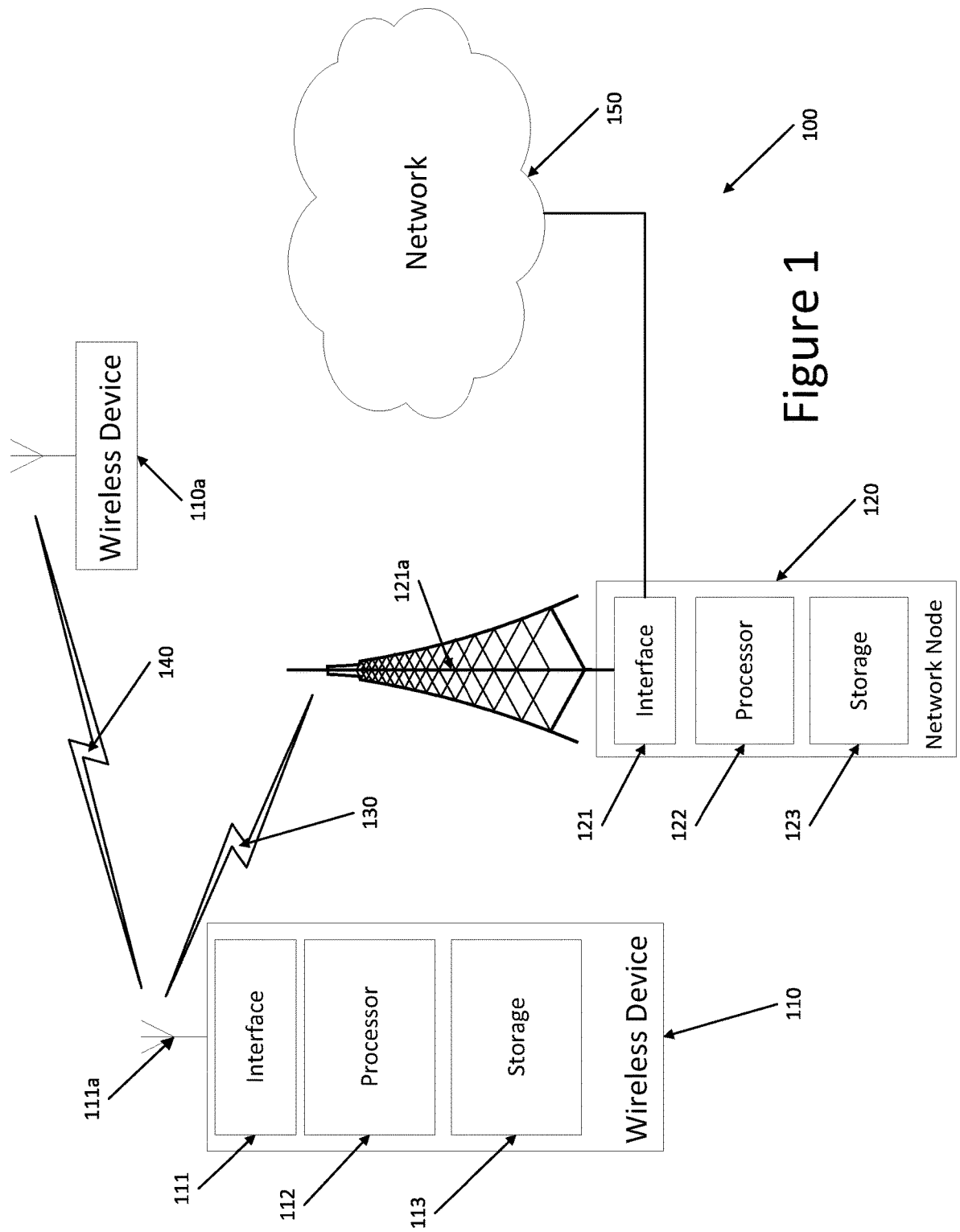
FIG. 1 illustrates a communication network comprising a more detailed view of a network node and a wireless device, in accordance with certain embodiments.

FIG. 1 illustrates a communication network comprising a more detailed view of network node 120 and WD 110, in accordance with a particular embodiment. For simplicity, communication network 100 of FIG. 1 only depicts network 150, network node 120, and WDs 110 and 110*a*. Network node 120 comprises processor 122, storage 123, and interface 121, including antenna 121*a*. Similarly, WD 110 comprises processor 112, storage 113, and interface 111, including antenna 111*a*. These components may work together in order to provide network node and/or wireless device functionality, such as providing wireless connections in a communications network and using reserved group IDs to allow WDs to know when to decode messages that are sent by WDs outside of their respective group. In different embodiments, communications network 100 may comprise any number of wired or wireless networks, network nodes, base stations, controllers, wireless devices, relay stations, and/or any other components that may facilitate or participate in the communication of data and/or signals whether via wired or wireless connections.

Network 150 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 120 comprises processor 122, storage 123, and interface 121, including antenna 121*a*. These components are depicted as single boxes located within a single larger box. In practice however, a network node may comprise multiple different physical components that make up a single illustrated component (e.g., interface 121 may comprise one or more terminals for coupling wires for wired connections and one or more radio transceivers for wireless connections). As another example, network node 120 may be a virtual network node in which multiple different physically separate components interact to provide the functionality of network node 120 (e.g., processor 122 may comprise three separate processors located in three separate enclosures, where each processor is responsible for a different function for a particular instance of network node 120). Similarly, network node 120 may be composed of multiple physically separate components (e.g., a NodeB component and a radio network controller (RNC) component, a base transceiver station (BTS) component and a base station controller (BSC) component, etc.), which may each have their own respective processor, storage, and interface components. In certain scenarios in which network node 120 comprises multiple separate components (e.g., BTS and BSC components), one or more of the separate components may be shared among several network nodes. For example, a single RNC may control multiple NodeB's. In such a scenario, each unique NodeB and RNC pair, may be considered a single separate network node. In some embodiments, network node 120 may be configured to support multiple RATs. In such embodiments, some components may be duplicated (e.g., separate storage 123 for the different RATs) and some components may be reused (e.g., the same antenna 121*a* may be shared by the RATs).

Processor 122 may be a combination of one or more of a microprocessor, controller, microcontroller, central processing unit, digital signal processor, application specific integrated circuit, field programmable gate array, or any other suitable processing circuitry or computing device, resource, or combination of hardware, software and/or encoded logic operable to provide, either alone or in conjunction with other network node 120 components, such as storage 123, network node 120 functionality. For example, processor 122 may execute instructions stored in storage 123. Such functionality may include providing various wireless features discussed herein to a wireless device, such as WD 110, including any of the steps or methods disclosed herein.

In certain embodiments, processor 122 may be used in provisioning WDs with one or more reserved group IDs and/or one or more non-reserved group IDs. The group IDs may be provisioned when the respective WD is initialized on the communication network provided by network node 120. The reserved group IDs may be reserved for certain emergency situations or incidents (such as traffic incidents). The non-reserved group IDs may be used by particular groups (e.g., firefighters, police officers, etc.). The combination of reserved and non-reserved group IDs may help to ensure that messages are received (and decoded) by the correct WDs. Further, the group IDs may also be used to set up encryption.

Storage 123 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 123 may store any suitable instructions, data or information, including software and encoded logic, utilized by network node 120. In some embodiments, storage 123 may store one or more reserved and non-reserved group IDs for use by WDs. The group IDs may be maintained in a list, database, or other organization of data that may be of useful in allowing network node 120 to be able to disseminate or provision the stored group IDs to WDs.

Network node 120 also comprises interface 121 (also referred to as transceiver or transceiver circuitry) which may be used in the wired or wireless communication of signalling and/or data between network node 120, network 150, and/or WD 110. Interface 121 may comprise circuitry for transmitting and receiving messages and data. For example, interface 121 may perform any formatting, coding, or translating that may be needed to allow network node 120 to send and receive data from network 150 over a wired connection. Interface 121 may also include a radio transmitter and/or receiver that may be coupled to or a part of antenna 121a. The radio may receive digital data that is to be sent out to other network nodes or WDs via a wireless connection. The radio may convert the digital data into a radio signal having the appropriate channel and bandwidth parameters. The radio signal may then be transmitted via antenna 121a to the appropriate recipient (e.g., WD 110).

Antenna 121a may be any type of antenna capable of transmitting and receiving data and/or signals wirelessly. In some embodiments, antenna 121a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 110 may be any type of wireless endpoint, mobile station, mobile phone, vehicle communication equipment, wireless local loop phone, smartphone, smart device, user equipment, desktop computer, PDA, cell phone, tablet, laptop, VoIP phone or handset, which is able to wirelessly send and receive data and/or signals to and from a network node, such as network node 120. WD 110 comprises processor 112, storage 113, and interface 111, including antenna 111a. Like network node 120, the components of WD 110 are depicted as single boxes located within a single larger box, however in practice a wireless device may comprises multiple different physical components that make up a single illustrated component (e.g., storage 113 may comprise multiple discrete microchips, each microchip representing a portion of the total storage capacity).

Processor 112 may be a combination of one or more of a microprocessor, controller, microcontroller, central processing unit, digital signal processor, application specific integrated circuit, field programmable gate array, or any other suitable processing circuitry, resource, or combination of hardware, software and/or encoded logic operable to provide, either alone or in combination with other WD 110 components, such as storage 113, WD 110 functionality. Such functionality may include providing various wireless features discussed herein, including any of the steps or methods disclosed herein. For example, in some embodiments, processor 112 may be configured to extract a group ID from a received message (e.g., by examining an SA associated with the message). Processor 112 may then use the extracted group ID to determine whether or not to decode the associated message. If the extracted group ID is a reserved group ID or a non-reserved group ID that matches one of the group IDS associated with WD 110, then the message is decoded, otherwise the message is not decoded.

Storage 113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by WD 110. In some embodiments storage 113 may maintain a list, database, or other organization of data (e.g. modulation scores) useful for storing reserved group IDs and non-reserved group IDs associated with WD 110. The group IDs may be pre-provisioned or they may be provisioned as part of the setup or initialization of WD 110 to a communication network. Regardless of how or when the group IDs are provisioned, once provisioned they may be stored by storage 114 and used in determining whether or not to decode a received message and/or what priority should be given to the received message.

Interface 111 (also referred to as transceiver or transceiver circuitry) may be used in the wireless communication of signalling and/or data between WD 110 and network node 120. Interface 111 may comprise circuitry for transmitting and receiving messages and data. For example, interface 111 may perform any formatting, coding, or translating that may be needed to allow WD 110 to send and receive data to and from network node 120 and/or WD 110a over a wireless connection. Interface 111 may also include a radio transmitter and/or receiver that may be coupled to or a part of antenna 111a. The radio may receive digital data that is to be sent via a wireless connection. The radio may convert the digital data into a radio signal having the appropriate channel and bandwidth parameters. The radio signal may then be transmitted via antenna 111a.

Antenna 111a may be any type of antenna capable of transmitting and receiving data and/or signals wirelessly. In some embodiments, antenna 111a may comprise one or more omni-directional, sector or panel antennas operable to transmit/receive radio signals between 2 GHz and 66 GHz. In some embodiments, antenna 111a may be integrated into interface 111. In some embodiments, WD 110 may not include an interface. For simplicity, antenna 111a may be considered a part of interface 111 to the extent that a wireless signal is being used.

The devices and their respective components may work together to provide message decoding based on group IDs. This functionality may be provided regardless of whether or not the WD is within coverage of a communication network, such as a cellular communication network, or is in any particular state with respect to control from a communication network (e.g., an idle state, such as RRC_IDLE, or situation in which a WD is in coverage of a communication network but not under its control). In particular, when interface 111 receives a message, processor 112 may use the group ID associated with the message to determine if, for example, the message is associated with some dynamic priority (e.g., imminent peril or emergency) or is sent by a WD within the same group as WD no. By using a reserved group ID when interface 111 transmits an emergency message, WD 110 may ensure that the message sent by interface 111 will be decoded by any relevant WDs that receive the message, even though they may not be in the same group as WD 110. This is in contrast to a normal transmission received by other WDs that are only decoded if the message was sent by a WD within the same group (e.g., the message had the same non-reserved group ID as is assigned to the respective WD). One advantage of this is that a transmitting WD does not have to know what other WDs are in the area and/or what their respective non-reserved group IDs are. In certain embodiments, the reserved group IDs may be set aside for special situations (e.g., emergency or imminent peril). When they are used, all the WDs (or a specific group of WDs) within range of the transmitting WD would listen to the transmission and then stop all ongoing transmissions and only listen to the emergency call.

In some embodiments, in order to not occupy the communication resources for too long and possibly hinder other important messages, one or more timers may be started when the emergency transmission containing the reserved group ID starts. When a timer expires normal ProSe communication (by the WDs that were involved in the dynamic emergency communication) may resume. In some embodiments, different reserved group IDs may be reserved for different scenarios. For example, there could be one or more reserved group IDs for a general emergency that would reach all WDs within a particular area (e.g., within radio communication range of the WD transmitting the message). As another example, there could be one or more reserved group IDs for a fire. Any message associated with such a reserved group ID would reach any WDs associated with a fire fighter or an emergency medical technician within the vicinity of WD 110. As another example, multiple reserved group IDs may be set aside for various levels of an emergency (e.g., a small fire may be a low level emergency where as a large forest fire at the edge of a big city may be a high level emergency).

When there is a need for a dynamic priority, such as an emergency situation, WD 110 may use one of the reserved group IDs. For example, if a fight breaks out at a sporting event, a police officer may, after selecting an emergency via the graphical user interface of the WD or a special emergency button, send a message with a reserved group ID indicating that there is an emergency in the vicinity of the WD.

In some embodiments, WD 110 may be pre-provisioned with a set of rules defining the actions and responsibilities required during such special scenarios (e.g., when to decode, when to listen, when to transmit, etc.). This may help promote trustworthy and consistent operation. The available actions, authorizations, and responsibilities for WD 110 when a message is received with a reserved group ID may be a function of static priority (e.g., what group WD 110 is associated with, the rank or role of the user of WD 110 within the group, etc.) in combination with the specific dynamic situation that has occurred. For example, if WD 110 receives a message with a reserved group ID associated with a fire, and WD 110 is being used by a fire chief, WD 110 may be able to take certain actions. These actions may be different if WD 110 received a message with a reserved group ID associated with a riot.

The following example may help illustrate how the components of FIG. 1 may work in some embodiments to allow decoding messages based on group IDs. In this example, it may be assumed that WDs 110 and 110a are outside of coverage of network node 120. It may also be assumed that WD 110 is associated with a police officer and that WD 110a is associated with a fire fighter. Neither WD is in the same group. Accordingly, neither of them are associated with the same non-reserved group IDs.

In this example, interface 111 may receive and/or monitor incoming messages. In some embodiments, processor 112 may monitor the incoming SAs to retrieve group IDs. The group ID may be used by processor 112 to determine whether or not to decode the associated message. This may allow WD 110 to receive ordinary communications and to be able to cooperate with other WDs in the group or in the vicinity (e.g., other police officers).

If the firefighter spots a fire, he may use a touchscreen input on WD 110a to select "FIRE" and then speak a message to be sent to nearby WDs. WD 110a may receive the indication that the forthcoming transmission relates to a fire emergency and may thus determine the appropriate reserved group ID. Once determined, WD 110a may insert the reserved group ID into an SA and then transmit a message with the determined reserved group ID in the SA. Interface 111 of WD 110 may receive the SA and the message from WD 110a. Based on the inclusion of the reserved group ID in the SA, processor 112 may determine that an emergency situation involving a fire is taking place somewhere nearby. In addition, the message that was transmitted by WD 110a (e.g., the message spoken by the firefighter) is decoded and presented to the police officer. In some embodiments, processor 112 may be able to determine the general nature of the emergency based on the specific reserved group ID that was used. In certain embodiments, in response to determining the existence of an emergency situation, processor 112 may apply some back-off or otherwise attempt to leave, or free-up (e.g., stop transmitting), wireless resources available for communications related to the fire emergency. This may persist for a time controlled by a timer.

In some scenarios, the data sent by WD 110a may continue to come after sending a message with the reserved group ID in the SA. Interface 111 will receive the data, and because there was a reserved group ID associated therewith, processor 112 will decode the incoming message (even though WD 110 and WD 110a are not part of the same group). The incoming data may include voice data, location or position data for WD 110a, and any other data that may be transmitted by WD 110a.

In some embodiments, processor 112 may also account for the priority of WD 110. This may allow processor 112 to decide whether to enable self-pre-emption. For example, if WD 110 has a low static priority associated therewith, processor 112 may decide to stop transmitting and only listen. As another example, if WD 110 has a high static priority associated therewith, processor 112 may decide that WD 110 may be allowed to transmit, but only after ensuring that WD 110a is not prevented from transmitting.

In some embodiments, the group ID could be sent in the SCI format 0 (that is sent in the SA) as a new field carrying the reserved group ID. For example, the emergency group ID can be a Boolean flag. This may allow the WDs in the surrounding area (e.g., within wireless communication range) to realize that an emergency situation is ongoing. In certain embodiments, specific reserved group IDs can be defined. For instance, different reserved group IDs can be preconfigured or configured by the operator for different emergency sessions (e.g., police, fire, ambulance, public security dispatchers, etc.) or other incidents (e.g., traffic accident, road construction, pedestrian crossing, etc.). In particular embodiments, a subset of current group destination IDs (e.g., those IDs that are already transferred in the SCI format in 3GPP Rel.12) are set aside as reserved group IDs assigned to, for example, emergency situations or incidents.

In many situations, there may arise a need to try to avoid or minimize collisions between non-emergency communication and emergency communication. In some embodiments, a transmitting WD with a low priority (e.g., WDs not belonging to a first responder group or belonging to a group not related to the ongoing emergency situation) may leave the floor to transmitting WDs belonging to emergency groups only if possible resource collision is detected upon reading the SA. This can be achieved by reading the resource block assignment and time pattern fields that are transferred in the SCI format of the SA. For example, assume that there is a fire and WD 110 (associated with the police officer) is in the vicinity. Interface 111 may have resource block assignments in PRBs 1-7 and time pattern: subframes 1, 4, 7, and 8. If WD 110a sends a message with a reserved group ID in which WD 110a uses resource block assignment in PRBs 5-7 and time pattern: subframes 1, 2, 3, 4, then processor 112 of WD 110 may have a few options as to how to reduce the risk of collisions. For example, processor 112 may determine that it should leave the floor to WD 110a and should not transmit in the SC period for which the SA is valid. As another example, processor 112 may determine that interface 111 should only transmit in those subframes in which WD 110a will not transmit (e.g., 7 and 8). As yet another example, processor 112 may determine that interface 111 should only transmit in those PRBs in which WD 110a will not transmit (e.g., 1-4).

Now, assume that the fire has reached a point where police officers are needed (e.g., to help with crowd control) and thus both WD 110 and WD 110a are actively involved in the emergency situation. As may be apparent, handling collision avoidance between WDs trying to make emergency transmissions may be difficult as both WDs may have legitimate need for the floor. In this case WD 110 and WD 110a can each perform one a few different options to avoid collisions. In some embodiments, the option that is used may be pre-provisioned or it may be specified by, for example, network node 120. One example mitigation option may be to apply a probability factor, for example processor 112 of WD 110, which effects the probability of whether or not WD 110 will transmit within a particular SC period (e.g., only take the floor and transmit 93% of the time, 7% of the time, wait for the next SC period). The probability may be preconfigured or provided by the network (in either case it may be maintained in storage 113). Another option may be that interface 111 will only transmit in those subframes in which other WDs involved in the emergency call will not transmit. Another similar option is that interface 111 will only transmit in those PRBs in which the other WDs involved in the emergency call will not transmit. In some embodiments, a combination of multiple options may be combined. For example, processor 112 may determine that interface 111 will not transmit where there is a potential collision (e.g., avoid the same PRB or subframe as the other WDs) but if there are no collision free options, then apply the probability. When applied to the group of WDs involved in a particular emergency, this may make it possible to randomize the interference and have the chance that some of the contending resources are actually used by contending WDs.

Figure 2:
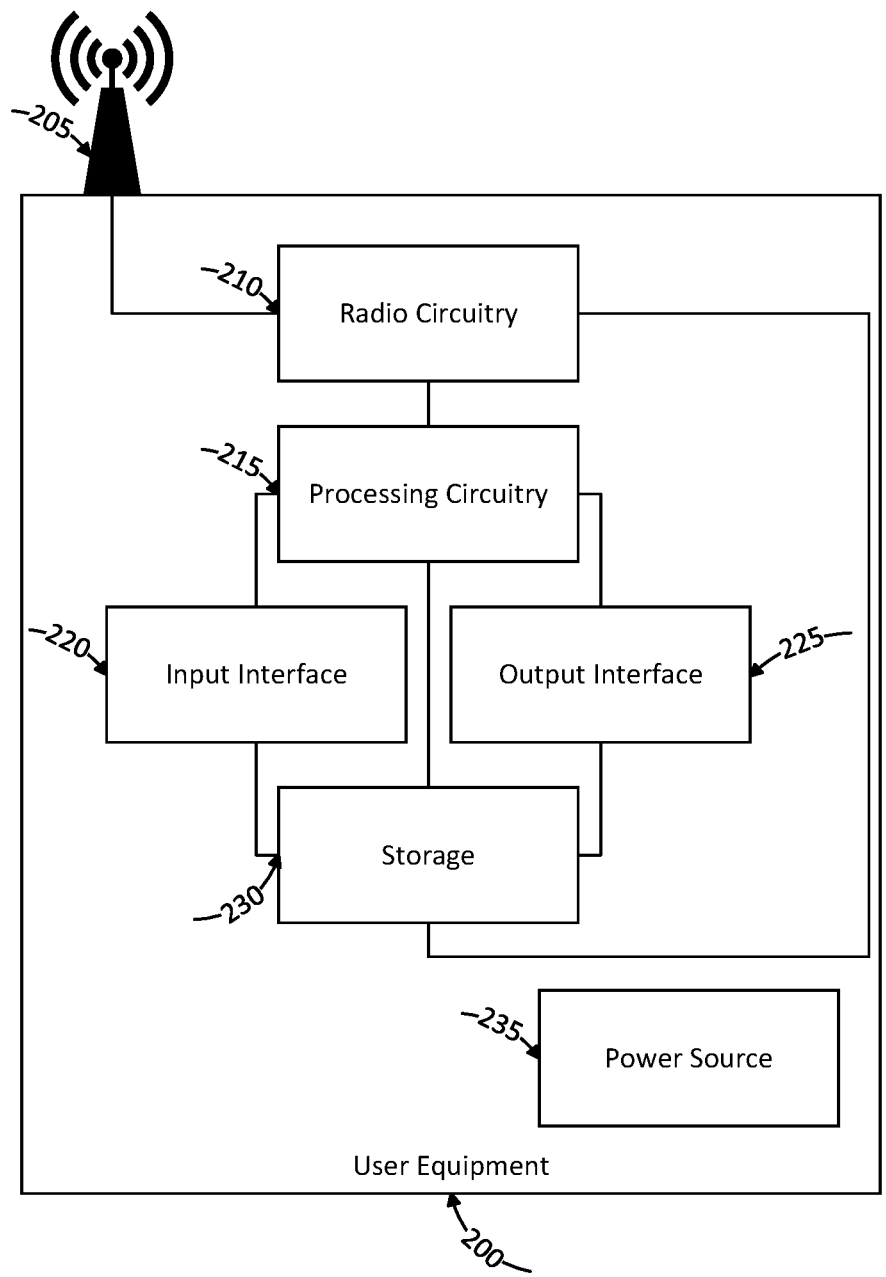
FIG. 2 illustrates a box diagram of a user equipment, in accordance with certain embodiments.

FIG. 2 illustrates a box diagram of a user equipment, in accordance with certain embodiments. Although the wireless device utilized in the example wireless communication network of FIG. 1 may represent a device that includes any suitable combination of hardware and/or software, this wireless device may, in particular embodiments, represent a wireless device such as the example user equipment 200 (UE 200) illustrated in greater detail by FIG. 2. In this example, UE 200 is user equipment such as a smart phone, tablet, or other such device capable of wireless communication. Although the illustrated embodiment includes certain components, in practice it may actually include any suitable combination of hardware and/or software needed to provide any of the features or functions disclosed herein.

As shown in FIG. 2, an example UE 200 includes antenna 205, radio front-end circuitry 210, processing circuitry 215, a computer-readable storage medium 230, input interface 220, output interface 225 and power source 235. Antenna 205 may include one or more antennas or antenna arrays, is configured to send and/or receive wireless signals, and is connected to radio front-end circuitry 210. In certain alternative embodiments, UE 200 may not include antenna 205, and antenna 205 may instead be separate from UE 200 and be connectable to UE 200 through an interface or port.

The radio front-end circuitry 210 may comprise various filters and amplifiers, is connected to antenna 205 and processing circuitry 215, and is configured to condition signals communicated between antenna 205 and processing circuitry 215. In certain alternative embodiments, UE 200 may not include radio front-end circuitry 210, and processing circuitry 215 may instead be connected to antenna 205 without radio front-end circuitry 210.

Processing circuitry 215 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In certain embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 215 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device or a UE may be provided by the processing circuitry 215 executing instructions stored on a computer-readable storage medium 230, as shown in FIG. 2. In alternative embodiments, some or all of the functionality may be provided by the processing circuitry 215 without executing instructions stored on a computer-readable medium, such as in a hardwired manner. In any of those particular embodiments, whether executing instructions stored on a computer-readable storage medium or not, the processing circuitry can be said to be configured to perform the described to functionality. The benefits provided by such functionality are not limited to the processing circuitry 215 alone or to other components of the wireless device, but are enjoyed by the wireless device as a whole, and/or by end users and the wireless network generally.

Antenna 205, radio front-end circuitry 210, and/or processing circuitry 215 may be configured to perform any receiving operations described herein as being performed by a wireless device. Any information, data and/or signals may be received from a network node and/or another wireless device.

The processing circuitry 215 may be configured to perform any determining operations described herein as being performed by a wireless device. Determining as performed by processing circuitry 215 may include processing information obtained by the processing circuitry 215 by, for example, converting the obtained information into other information, comparing the obtained information or converted information to information stored in the wireless device, and/or performing one or more operations based on the obtained information or converted information, and as a result of said processing making a determination.

Antenna 205, radio front-end circuitry 210, and/or processing circuitry 215 may be configured to perform any transmitting operations described herein as being performed by a wireless device. Any information, data and/or signals may be transmitted to a network node and/or another wireless device.

Computer-readable storage medium 230 is generally operable to store instructions, such as a computer program, software, an application including one or more of logic, rules, code, tables, etc. and/or other instructions capable of being executed by a processor. Computer-readable storage medium may also generally store data such as pre-provisioned data, recorded data, received, generated or determined data (including both intermediate data, such as calculation results, and final data, such as determination results). Examples of computer-readable storage medium 230 include computer memory (for example, Random Access Memory (RAM) or Read Only Memory (ROM)), mass storage media (for example, a hard disk), removable storage media (for example, a Compact Disk Disc (CD) or a Digital Video Disk (DVD)), and/or any other volatile or non-volatile, non-transitory computer-readable and/or computer-executable memory devices that store information, data, and/or instructions that may be used by processing circuitry 215. In some embodiments, storage 230 may be supplemented by cloud based storage. In some embodiments, processing circuitry 215 and computer-readable storage medium 230 may be considered to be integrated.

Some of the illustrated components of user equipment 200 may be optional depending on the needs of the user equipment. For example, UE 200 includes input interface 220 and output interface 225. Input interface 220 may comprise circuitry and/or components that are configured to allow input of information into UE 200, and is connected to processing circuitry 215 to allow processing circuitry 215 to process the input information. For example, input interface 220 may include a microphone, a proximity or other sensor, keys/buttons, a touch display, one or more cameras, a USB port, or other input elements. Output interface 225 may comprise circuitry and/or components that are configured to allow output of information from UE 200 and is connected to processing circuitry 215 to allow processing circuitry 215 to output information from UE 200. For example, output interface 225 may include a speaker, a display, vibrating circuitry, a USB port, a headphone interface, or other output elements. Using one or more input and output interfaces, UE 200 may communicate with end users, other devices and/or the wireless network, and allow them to benefit from the functionality described herein. For example, output interface 225 may present a user with multiple transmit options (e.g., one button for each group with which UE 200 is associated, a "FIRE," button, a "POLICE" button, a "MEDICAL" button, etc.).

UE 200 includes power source 235. Power source 235 may comprise power management circuitry that receives power from a power supply. The power supply may either be comprised in, or be external to the power management circuitry. For example, power source 235 may comprise a power supply in the form of a battery or battery pack which is connected to, or integrated in or with, power management circuitry. Other types of power supplies, such as photovoltaic devices, may also be used. As another example, power source 235 may be connectable to an external power supply (such as an electricity outlet) via an input circuitry or interface such as an electrical cable, whereby the external power supply provides power to power management circuitry with converts the power (e.g., convert the power from AC to DC) into a form suitable for use by, for example, processing circuitry 215.

Power source 235 may be connected to radio front-end circuitry 210, processing circuitry 215, and/or computer-readable storage medium 230 and be configured to supply UE 200, including processing circuitry 215, with power for performing the functionality described herein.

UE 200 may also include multiple sets of processing circuitry 215, computer-readable storage medium 230, radio circuitry 210, and/or antenna 205 for different wireless technologies integrated into UE 200, such as, for example, GSM, WCDMA, LTE, NR, Wi-Fi, or Bluetooth wireless technologies. These wireless technologies may be integrated into the same or different chipsets and other components within UE 200.

Figure 3:
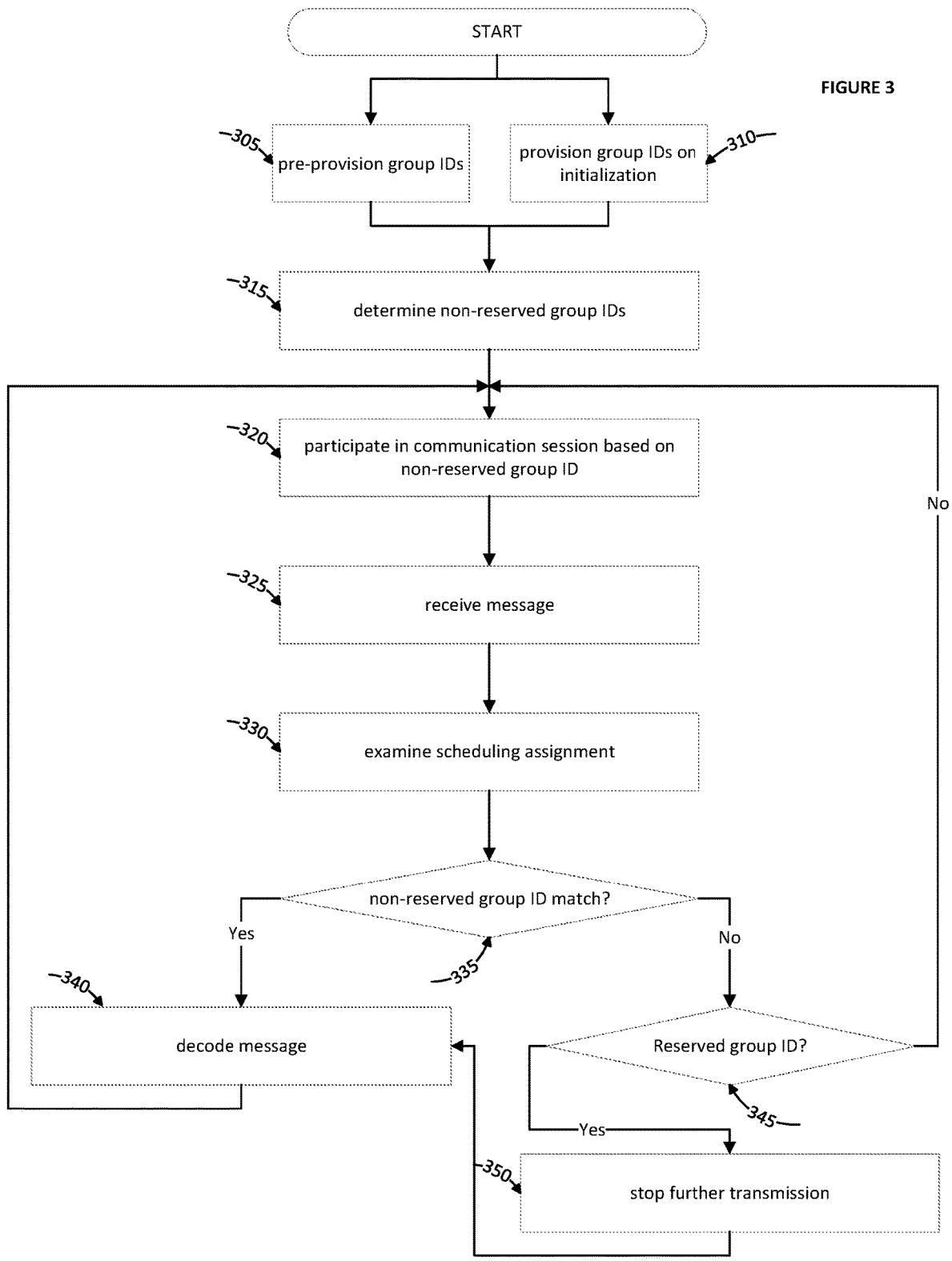
FIG. 3 illustrates a method for decoding messages based on group IDs, in accordance with certain embodiments.

FIG. 3 illustrates a method for decoding messages based on group IDs, in accordance with certain embodiments. Unless otherwise noted, the steps depicted herein are equally applicable for WDs within, and outside of, wireless coverage of a network node, such as a base station. The method is from the perspective of a WD.

The method begins at steps 305 and 310 where group IDs are provisioned. Although the two steps are shown in parallel, in practice, the two steps may be separated by an extended period of time. For example, one or more reserved group IDs may be pre-provisioned when the phone is manufactured, when the phone is prepped for sale (e.g., the carrier may supply reserved group IDs before the phone is made available for purchase), when the phone is prepped for use (e.g., a company's IT department may supply reserved group IDs before the phone is to distributed to employees), etc. Then, once the WD is powered-on by a user one or more non-reserved group IDs may be provisioned by the carrier when the WD is initialized for wireless communication with the carrier's network, by the user (e.g., the user may enter information into the WD or log into the wireless device), etc. Although the examples above discuss pre-provisioned reserved group IDs and provisioned non-reserved group IDs, such may not always be the case. For example, a carrier my change or update the reserved group IDs. These may then be communicated to the WD the next time the WD is initialized or communicates with the carrier's wireless network.

At step 315 the WD determines the one or more non-reserved group IDs that have been provisioned (or pre-provisioned) to, and are associated with, the wireless device. These non-reserved group IDs may coincide with the groups with which the user of the wireless device is associated. For example, the user may be a police officer, in which case the WD may have associated there with a non-reserved group ID that is used by the local police department. The non-reserved group ID may be used by the WD to determine the group communication session in which to participate. The WD may decode received messages that are associated with the same non-reserved group ID that is associated with the WD.

At step 320 the WD participates in a communication session based on the one or more non-reserved group IDs that were determined to be associated with the WD. In some embodiments the communication session may be a push-to-talk communication session. The WD may participate in the communication session through the use of the non-reserved group ID. For example, in some embodiments the WD may include the non-reserved group ID in a scheduling assignment that is transmitted as part of any communication it sends to the group. Similarly, the WD will decode any communication that is received by the WD that has a matching non-reserved group ID.

At step 325 the WD receives a message from another WD. The received message contains a group ID. In this method, the group ID is communicated in a scheduling assignment. Depending on the scenario, the message may be received from the other WD directly, or indirectly. For example, if either, or both, of the WDs are outside of a carrier's wireless network coverage, then the message may be sent directly between the WDs. As another example, if both of the WDs are within coverage of a carrier's wireless network, then the message may be sent through a network node.

At step 330 the WD examines the scheduling assignment. The scheduling assignment may be configured so as to be backwards compatible with 3GPP Release 12. The scheduling assignment is examined to determine or otherwise extract the group ID from the message. Once the group ID has been determined, the WD may then determine whether or not it matches one of the non-reserved group IDs (step 335) associated with the WD or whether or not it matches one of the reserved group IDs (step 345) associated with an emergency or incident.

If, at step 335, the group ID is one of the non-reserved group IDs associated with the WD, then at step 340 the associated data is decoded and the method returns to step 320 with the WD participating in the communication session. If the group ID does not match the non-reserved group IDs associated with the WD, then the method proceeds to step 345 where the group ID is compared to the reserved group IDs.

If, at step 345, the group ID is one of the reserved group IDs, then at step 350, the WD may stop, or prevent, further transmission of communications from the WD. In some embodiments, this may involve finishing transmitting a current message and then stopping future transmissions. In some embodiments, this may involve interrupting a current transmission to decode the incoming message. In some embodiments, it may involve stopping the use of certain resources that it uses for transmitting (e.g., the WD may use fewer PRBs). In some embodiments, the WD may be able to receive and transmit simultaneously, in which case, the incoming transmission may be received and decoded and the outgoing message may be sent, but then future outgoing messages may be stopped. Any of these measures invoked upon receiving the emergency message may be time limited. Then, at step 340 the message is decoded and the method returns to step 320. In some embodiments, the WD may, instead of returning to 320, may, for a certain period of time, join an emergency group to prioritize communications related to the incident which was the basis for the use of the reserved group ID.

If the group ID does not match one of the non-reserved group IDs associated with the WD and is not one of the reserved group IDs, then the WD may not decode the message since it was not intended for the WD to receive the message. The method may then return to step 320.

Figure 4:
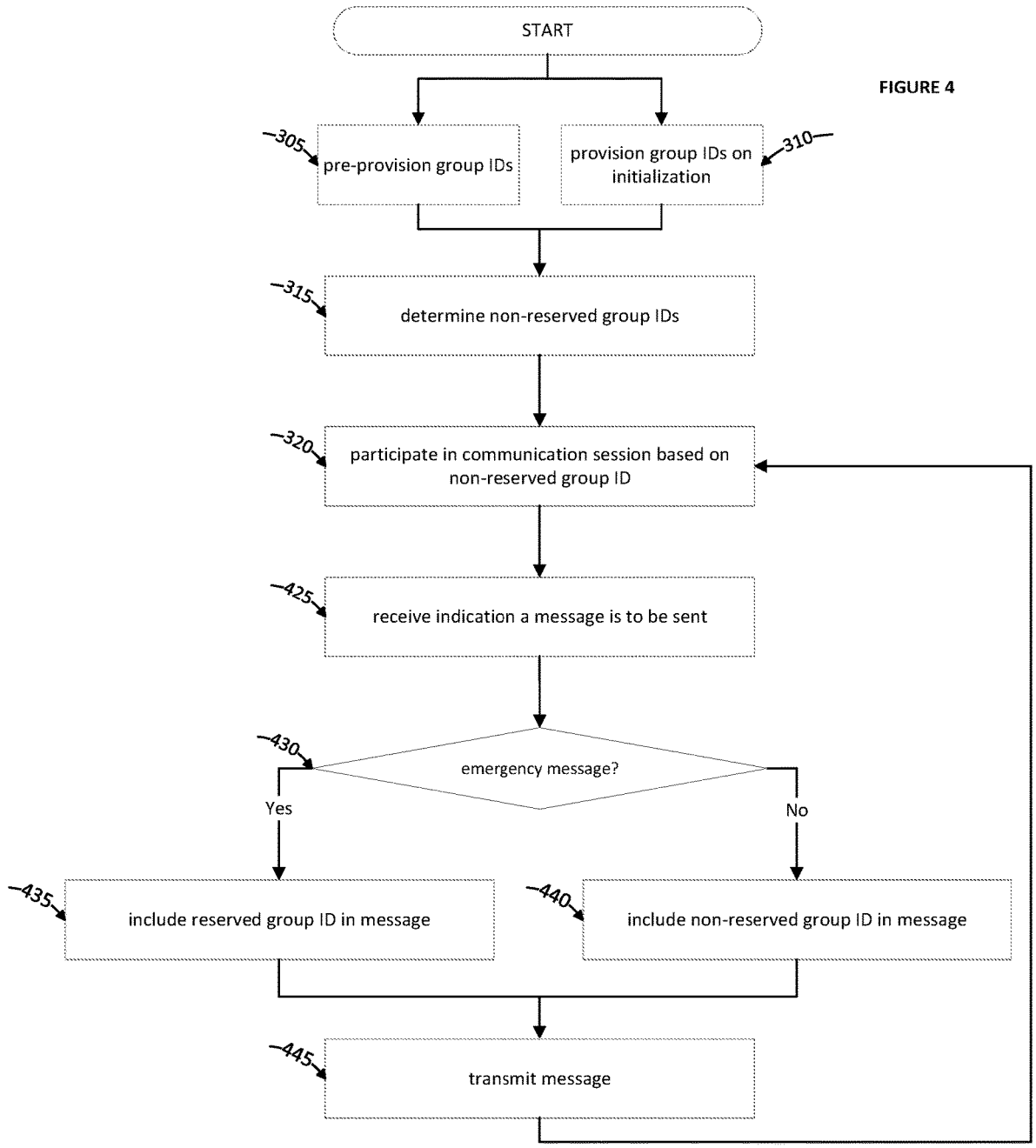
FIG. 4 illustrates a method for transmitting messages to be decoded based on group IDs, in accordance with certain embodiments.

FIG. 4 illustrates a method for transmitting messages to be decoded based on group IDs, in accordance with certain embodiments. Unless otherwise noted, the steps depicted herein are equally applicable for WDs within, and outside of, wireless coverage of a network node, such as a base station. The method is from the perspective of a WD. The first 4 steps (steps 305 through 320) are similar to those described above with respect to FIG. 3 and are numbered accordingly.

Once the WD is participating in a communication session, at step 425 the WD receives an indication that a message is to be sent. For example, a user may press a button on the WD or select an icon or "soft button" on the user interface of the WD. In some embodiments, the WD may comprise multiple buttons that may be pressed or selected, in which different buttons are pressed or selected depending on what group the forthcoming communication is to be sent. In some embodiments, the indication may be received from the WD itself, or a component coupled thereto. For example, a sensor may detect a person crossing the street or a processor may determine that there is congestion.

At step 430 the WD determines whether or not the message is to be a standard message or an emergency message. This may be determined by how the indication was received (e.g., what button was pressed, what sensor or device sent the indication etc.) or by information in the indication itself (e.g., what soft button was pressed, what kind of incident was detected, etc.).

If the message to be sent is an emergency message, then at step 435 the corresponding reserved group ID is included (e.g., in a SA) and the message is to transmitted in step 445. If the message to be sent is not an emergency message, then at step 440 the corresponding non-reserved group ID is included (e.g., in a SA) and the message is transmitted in step 445.

The steps described above are merely illustrative of certain embodiments. It is not required that all embodiments incorporate all the steps above nor that the steps be performed in the exact order depicted in the flow charts. For example, in some embodiments, the WD may be able to receive and decode messages at the same time that it transmits a message. In such an embodiment, steps 340 (decode message) and 350 (stop further transmission) may be swapped or run in parallel. Furthermore, some embodiments may include steps or features not illustrated herein. For example, in some embodiments, the method in FIG. 3 may include receiving user input indicative of the user's identity, or the group with which the user is a part of.

The steps illustrated in FIGS. 3 and 4 and described above, may be performed through a computer program product that may, for example, be executed by the components and equipment illustrated in FIG. 1 or 2. For example, storage 113 may comprise computer readable means on which a computer program can be stored. The computer program may include instructions which cause processor 112 (and any operatively coupled entities and devices, such as interface 111 and storage 113) to execute methods according to embodiments described herein. The computer program and/or computer program product may thus provide means for performing any steps herein disclosed.

Figure 5:
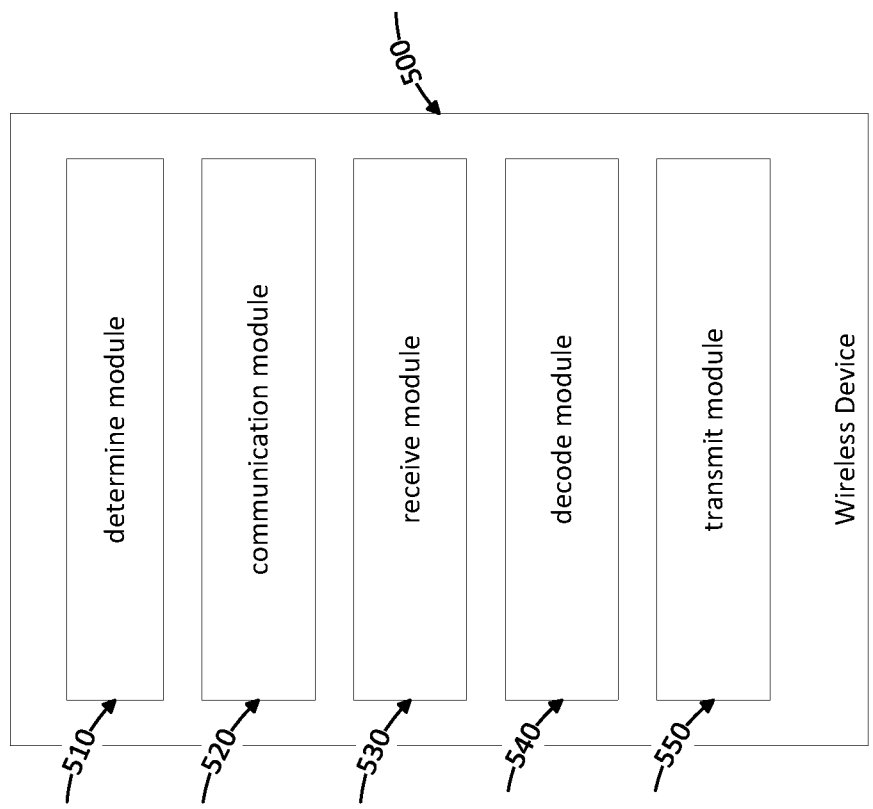
FIG. 5 is a schematic block diagram illustrating the functional modules used in decoding messages based on group IDs, in accordance with certain embodiments.

FIG. 5 is a schematic block diagram illustrating the functional modules used in decoding messages based on group IDs, according to particular embodiments. In particular, there is depicted the functional modules of a particular wireless device 500. Other embodiments may include more, fewer, or different functional modules. Moreover, a single depicted module may represent multiple similar modules. For example, determine module 510, may comprise a first and a second determine module, each module responsible for making a different determination. The modules may comprise software, computer programs, sub-routines, libraries, source code, or any other form of executable instructions that are run by, for example, a processor. In this FIG. 5, wireless device 500 comprises determine module 510, communication module 520, receive module 530, decode module 540, and transmit module 550. In general terms, each functional module depicted therein may be implemented in hardware and/or in software. Preferably, one or more or all functional modules may be implemented by processor 112, possibly in cooperation with storage 113. Processor 112 and storage 113 may thus be arranged to allow processor 112 to fetch instructions from storage 113 and execute the fetched instructions to allow the respective functional module to perform any steps or functions disclosed herein. The illustrated modules may further be configured to perform other functions or steps not explicitly described with respect to the respective module, including providing any features or functions disclosed with respect to any of the other figures. For example, transmit module 550 may be configured to transmit messages for decoding that include a reserved group ID or a non-reserved group ID based on the intended audience for the message transmitted.

Looking now at the illustrated modules in more detail, determine module 510 may be configured to determine one or more non-reserved group IDs associated with a wireless device. This may comprise searching a database or other organization of data maintained by the storage of the WD. The non-reserved group IDs may be pre-provisioned or provisioned during initialization of the WD on a carrier's wireless network. Determine module 510 may also be configured to determine whether a group ID contained in a received message is a reserved group ID or a non-reserved group ID. The group ID may be determined by examining a scheduling assignment associated with the first message. The group ID may then be compared to the reserved and non-reserved group IDs stored in the WD's storage.

Communication module 520 may be configured to participate in a communication session based on a non-reserved group ID associated with the wireless device. The non-reserved group ID associated with the wireless device may be based on the group with which the user of the WD is involved. For example, if the user is a paramedic, the WD may be associated with a non-reserved group ID that is used by the local paramedic's first responder group. In this embodiment, the communication session may be a push-to-talk communication session. In other embodiments, the communication session may be a machine to machine or device to device communication session such as between cars and roadside units.

Receive module 530 may be configured to receive a message from a second wireless device. The received message may comprise a second group ID. In this example, the second group ID is not among the one or more non-reserved group IDs associated with the WD. That is, in this example, the message was not sent by a paramedic from the same first responder group (e.g., the same group to which the paramedic using wireless device 500 belongs). In other embodiments, the message may be sent by a traffic alert system to alert WD (e.g., a vehicle) of an upcoming traffic incident (e.g., a crash, congestion, etc.).

Decode module 540 may be configured to decode the first message based on the group ID of the message. That is, if the message is associated with a reserved group ID, decode module 540 may decode the message as a high priority message (e.g., it is an emergency message). If the message is associated with a non-reserved group ID that matches a non-reserved group ID associated with the WD, then decode module 540 may decode the message a normal priority message (e.g., a non-emergency message). In both scenarios, the actual priority of the message may further be modified by other, normal, priority factors (e.g., the rank of the sender).

Transmit module 550 may be configured to, upon determining the second group ID is a reserved group ID, stop further transmission by the wireless device. Because a reserved group ID is used for an emergency, by stopping further transmission, WD 500 may help conserve wireless resources for emergency use.

In view of the above disclosure, at least some of the herein disclosed embodiments may be summarized as allowing group IDs to be used in determining whether or not to decode incoming messages. Certain aspects of the inventive concept have mainly been described above with reference to a few embodiments. However, as is readily appreciated by a person skilled in the art, embodiments other than the ones disclosed above are equally possible and within the scope of the inventive concept, as defined by the appended claims. For example, while the focus has been on a UE type WD, other WDs, such as vehicles, may be able to take advantage of the use of reserved group IDs for decoding emergency messages. Similarly, while a number of different combinations have been discussed, all possible combinations have not been listed herein. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method for decoding a received message, the method comprising:
    determining one or more non-reserved group IDs associated with a first wireless device;
    participating in a communication session based on a first group ID of the one or more non-reserved group IDs associated with the first wireless device;
    receiving a first message from a second wireless device, the first message comprising a second group ID, the second group ID not among the one or more non-reserved group IDs associated with the first wireless device;
    determining the second group ID is a reserved group ID;
    decoding the first message based on the second group ID; and
    stopping further transmission by the first wireless device upon determining that the second group ID is a reserved group ID.

2. The method of claim 1, wherein the first wireless device is a vehicle and the first message further comprises information about a traffic incident.

3. The method of claim 1, wherein the communication session is a push to talk communication session.

4. The method of claim 1, wherein the reserved group ID is part of one or more reserved group IDs that are pre-provisioned with the first wireless device.

5. The method of claim 1, wherein the reserved group ID is part of one or more reserved group IDs that are provisioned with the first wireless device after the first wireless device is initialized on a communication network.

6. The method of claim 1, wherein determining the second group ID is a reserved group ID comprises examining a scheduling assignment associated with the first message.

7. The method of claim 1, wherein the first wireless device is configured for cellular communication but is out of range of a carrier's wireless network.

8. A wireless device for decoding a received message, the wireless device comprising:
    processing circuitry configured to determine one or more non-reserved group IDs associated with the wireless device;
    transceiver circuitry configured to:
        participate in a communication session based on a first group ID of the one or more non-reserved group IDs associated with the wireless device; and
        receive a first message from a second wireless device, the first message comprising a second group ID, the second group ID not among the one or more non-reserved group IDs associated with the wireless device;
    wherein the processing circuitry is further configured to:
        determine the second group ID is a reserved group ID;
        decode the first message based on the second group ID; and
            stop further transmission by the first wireless device upon determining that the second group ID is a reserved group ID.

9. The wireless device of claim 8, wherein the wireless device is a vehicle and the first message further comprises information about a traffic incident.

10. The wireless device of claim 8, wherein the communication session is a push to talk communication session.

11. The wireless device of claim 8, wherein the reserved group ID is part of one or more reserved group IDs that are pre-provisioned with the wireless device.

12. The wireless device of claim 8, wherein the reserved group ID is part of one or more reserved group IDs that are provisioned with the wireless device after the wireless device is initialized on a communication network.

13. The wireless device of claim 8, wherein the processing circuitry configured to determine the second group ID is a reserved group ID comprises processing circuitry configured to examine a scheduling assignment associated with the first message.

14. The wireless device of claim 8, wherein the wireless device is configured for cellular communication but is out of range of a carrier's wireless network.

15. A wireless device for decoding a received message, the wireless device comprising processing circuitry and non-transitory computer readable storage media, the storage media containing instructions executable by the processing circuitry, whereby the wireless device is configured to:
    determine one or more non-reserved group IDs associated with the wireless device;
    participate in a communication session based on a first group ID of the one or more non-reserved group IDs associated with the wireless device;
    receive a first message from a second wireless device, the first message comprising a second group ID, the second group ID not among the one or more non-reserved group IDs associated with the wireless device;
    determine the second group ID is a reserved group ID;
    decode the first message based on the second group ID; and
    stop further transmission by the first wireless device upon determining that the second group ID is a reserved group ID.

16. The wireless device of claim 15, wherein the wireless device is a vehicle and the first message further comprises information about a traffic incident.

17. The wireless device of claim 15, wherein the communication session is a push to talk communication session.

18. The wireless device of claim 15, wherein the reserved group ID is part of one or more reserved group IDs that are pre-provisioned with the wireless device.

19. The wireless device of claim 15, wherein the reserved group ID is part of one or more reserved group IDs that are provisioned with the wireless device after the wireless device is initialized on a communication network.

20. The wireless device of claim 15, wherein to determine the second group ID is a reserved group ID, the wireless device is further configured to examine a scheduling assignment associated with the first message.

21. The wireless device of claim 15, wherein the wireless device is configured for cellular communication but is out of range of a carrier's wireless network.

22. A user equipment, UE, for decoding a received message, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to:
        determine one or more non-reserved group IDs associated with the UE;
        participate in a communication session based on a first group ID of the one or more non-reserved group IDs associated with the UE;
        receive a first message from a wireless device, the first message comprising a second group ID, the second group ID not among the one or more non-reserved group IDs associated with the UE;
determine the second group ID is a reserved group ID;
decode the first message based on the second group; and
stop further transmission by the first wireless device upon determining that the second group ID is a reserved group ID;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

23. The UE of claim 22, wherein the communication session is a push to talk communication session.

24. The UE of claim 22, wherein the reserved group ID is part of one or more reserved group IDs that are pre-provisioned with the UE.

25. The UE of claim 22, wherein the reserved group ID is part of one or more reserved group IDs that are provisioned with the UE after the UE is initialized on a communication network.

26. The UE of claim 22, wherein the processing circuitry configured to determine the second group ID is a reserved group ID comprises processing circuitry configured to examine a scheduling assignment associated with the first message.

27. The UE of claim 22, wherein the UE is configured for cellular communication but is out of range of a carrier's wireless network.

* * * * *